(12) United States Patent
Um et al.

(10) Patent No.: US 8,898,700 B2
(45) Date of Patent: Nov. 25, 2014

(54) METHOD AND SYSTEM FOR DISPLAYING DIGITAL BROADCAST DATA

(75) Inventors: Eun Song Um, Gumi-si (KR); Seong Geun Kwon, Daegu (KR); Jong Kerl Lee, Gumi-si (KR)

(73) Assignee: Samsung Electronics Co., Ltd (KR)

( * ) Notice: Subject to any disclaimer, the term of this patent is extended or adjusted under 35 U.S.C. 154(b) by 1252 days.

(21) Appl. No.: 11/859,608

(22) Filed: Sep. 21, 2007

(65) Prior Publication Data

US 2008/0082997 A1    Apr. 3, 2008

(30) Foreign Application Priority Data

Sep. 29, 2006   (KR) .................. 10-2006-0095541

(51) Int. Cl.
| | | |
|---|---|---|
| H04N 5/50 | (2006.01) | |
| H04H 60/91 | (2008.01) | |
| H04N 5/44 | (2011.01) | |
| H04N 21/434 | (2011.01) | |
| H04N 21/4363 | (2011.01) | |
| H04N 21/422 | (2011.01) | |
| H04N 21/4227 | (2011.01) | |
| H04N 21/436 | (2011.01) | |
| H04N 7/16 | (2011.01) | |
| H04N 21/41 | (2011.01) | |
| H04N 21/414 | (2011.01) | |
| H04N 21/438 | (2011.01) | |
| H04H 60/80 | (2008.01) | |

(52) U.S. Cl.
CPC .............. *H04H 60/80* (2013.01); *H04H 60/91* (2013.01); *H04N 5/4401* (2013.01); *H04N 21/4341* (2013.01); *H04N 21/43637* (2013.01); *H04N 21/42204* (2013.01); *H04N 21/4227* (2013.01); *H04N 21/43615* (2013.01); *H04N 7/161* (2013.01); *H04N 21/4122* (2013.01); *H04N 21/41407* (2013.01); *H04N 21/436* (2013.01); *H04N 21/4383* (2013.01); *H04N 21/4126* (2013.01); *H04N 5/50* (2013.01)
USPC .......................................................... 725/38

(58) Field of Classification Search
CPC .............. H04H 60/91; H04N 21/4126; H04N 21/41407; H04N 21/42204; H04N 21/43615; H04N 21/43637; H04N 5/4401
See application file for complete search history.

(56) References Cited

U.S. PATENT DOCUMENTS 6,177,931 B1 *  1/2001  Alexander et al. .............. 725/52
2003/0072257 A1  4/2003  Ikedo et al.
(Continued)

FOREIGN PATENT DOCUMENTS

EP    1 180 903    2/2002
EP    1 307 062    5/2003
(Continued)

*Primary Examiner* — Rong Le
(74) *Attorney, Agent, or Firm* — The Farrell Law Firm, P.C.

(57) ABSTRACT

A method and system for displaying digital broadcast signals are disclosed. The method displays a broadcast signal, transmitted from a portable terminal having a digital broadcast receiver, on an external device having a decoding unit. When the external device transmits a digital broadcast playback request and selected channel information, the portable terminal controls the digital broadcast receiver to select a broadcast channel according to the selected channel information, demultiplexes a broadcast signal of the selected broadcast channel, and transmits the demodulated broadcast signal. The external device classifies the demodulated broadcast signal as audio, video, and broadcast information, decodes the classified signals and plays them back. When a communication event is generated while the portable terminal demodulates and transmits the broadcast signals of the selected broadcast channel, the communication event is transmitted to the external device and a wireless communication route is established to process the communication event.

21 Claims, 10 Drawing Sheets

| Stream | | | | If(sub CMD==0x31-0x31) | | If(Main CMD == 0x'0) |
|---|---|---|---|---|---|---|
| Sync. 1 byte (0xA6) | Main CMD 1 byte | Sub. CMD 1 byte | Parameter 4 byte | Call/SMS Data 356 byte | Packet Length 2 byte | Payload |

(56) References Cited

U.S. PATENT DOCUMENTS

| | | | |
|---|---|---|---|
| 2004/0203835 A1* | 10/2004 | Trottier et al. | 455/454 |
| 2004/0268408 A1* | 12/2004 | Lee et al. | 725/116 |
| 2005/0186988 A1* | 8/2005 | Lim et al. | 455/557 |
| 2006/0146195 A1 | 7/2006 | Yoon | |
| 2007/0250894 A1* | 10/2007 | Kim | 725/133 |

FOREIGN PATENT DOCUMENTS

| | | |
|---|---|---|
| EP | 1 553 794 | 7/2005 |
| EP | 1 643 759 | 4/2006 |
| JP | 2003-009011 | 1/2003 |
| KR | 10-2003-0046733 A | 6/2003 |
| KR | 1020030046733 | 6/2003 |
| KR | 1020050037456 | 4/2005 |
| KR | 1020050083086 | 8/2005 |
| KR | 10-2006-0039503 | 5/2006 |
| KR | 1020060039503 | 5/2006 |
| KR | 1020060056761 | 5/2006 |
| KR | 10-2006-0093579 | 8/2006 |
| KR | 1020060093579 | 8/2006 |
| KR | 1020070050714 | 5/2007 |

* cited by examiner

FIG. 4A

Stream | Sync. 1 byte (0xA6) | Main CMD 1 byte | Sub. CMD 1 byte | Parameter 4 byte | Call/SMS Data 356 byte | Packet Length 2 byte | Payload If(sub CMD == 0x31-0x34)

If(Main CMD == 0x?0)

FIG. 4B

| Check 2 byte (0x0030) | Seq_num 2 byte | TS_copy_size 4 byte | EPG_check_flag 2 byte | EPG_Ch_count 2 byte | Current_main_service_ID 2 byte | Current_sub_service_ID 2 byte | Reserved 16 byte | EPG Data 2440 byte | TS Data 188*80 byte |

If(EPG_check_flag == 0x0001)

METHOD AND SYSTEM FOR DISPLAYING DIGITAL BROADCAST DATA

PRIORITY

This application claims priority under 35 U.S.C. §119 to an application entitled "METHOD AND SYSTEM FOR DISPLAYING DIGITAL BROADCAST DATA" filed in the Korean Intellectual Property Office on Sep. 29, 2006 and assigned Serial No. 2006-0095541, the contents of which are incorporated herein by reference.

BACKGROUND OF THE INVENTION

1. Field of the Invention

The present invention relates generally to digital broadcasting, and in particular, to a method and system for displaying digital broadcast signals on an external device that is linked to a portable terminal including a digital broadcast receiver.

2. Description of the Related Art

Portable terminals are intended to install a multimedia-dedicated processor to enhance multimedia functions. Portable terminals install a digital broadcast receiver to enhance multimedia functions. To provide numerous multimedia functions, portable terminals must be configured to include a plurality of parts, which increases complexity of their configurations and makes their control harder.

Conventional portable terminals have a restriction in the size of a display unit for displaying multimedia data and in the playback ability of the speaker. Since the conventional portable terminals, such as a mobile phone, etc., are relatively small, the screen size of the display unit for displaying the received broadcast signal and the sound performance must be necessarily restricted. To resolve such a restriction, the portable terminals add a function to associate with an external device that their outputs can be played back through the external device. In that case, the portable terminals demodulate received broadcast signals; separate video and audio signals from the demodulated broadcast signals to decode them, respectively; and convert the decoded video and audio signals into the video and audio signals to output the converted signals to the external device.

However, the conventional broadcast signal process increases the amount of audio and video signals that the portable terminal will transmit. The portable terminal must transmit decoded broadcast signals to the external device. But the decoded broadcast signals include a large amount of information much greater than that of compressed broadcast signals. In particular, when the broadcast signals are digital broadcast signals, it is difficult for the portable terminal to transmit video data to the external device at 25 frames per second.

Also, the conventional broadcast signal process is disadvantageous in that the external device is only able to play back the broadcast signals transmitted from the portable terminal but not to control the broadcast signals. Although the conventional portable terminal is configured to be equipped with a communication function and thus provides incoming and outgoing call functions, it cannot process an incoming call signal received while the external device is playing broadcast signals back. Also, the conventional portable terminal cannot process an outgoing call signal while the external device is playing broadcast signals back.

SUMMARY OF THE INVENTION

The present invention is made to solve the above problems, and therefore, the present invention provides a method and system for displaying broadcast signals on an external device, which are transmitted from a portable terminal including a digital broadcast receiver.

The present invention further provides a method and system where an external device play back a broadcast signal transmitted from a portable terminal including a digital broadcast receiver when the external device requests selecting a channel to the portable terminal, the portable terminal demodulates broadcast signals of the selected channel and transmits the demodulated broadcast signals to the external device; and the external device decodes the demodulated broadcast signals and plays back the decoded broadcast signals.

The present invention further provides a method and system where an external device plays back a broadcast signal transmitted from a portable terminal including a digital broadcast receiver; and when requesting an outgoing call, the portable terminal transmits the broadcast signal to the external device, thereby providing the outgoing call.

The present invention further provides a method and system where an external device plays back a broadcast signal transmitted from a portable terminal including a digital broadcast receiver; and when requesting incoming call, the portable terminal transmits the broadcast signal to the external device, thereby providing the incoming call.

BRIEF DESCRIPTION OF THE DRAWINGS

The above and other objects, features, and advantages of the present invention will become more apparent from the following detailed description when taken in conjunction with the accompanying drawings, in which:

FIGS. 4A and 4B are protocol structures for playing back the digital broadcast signals between a portable terminal and an external device, according to the present invention;

DETAILED DESCRIPTION OF THE PREFERRED EMBODIMENTS

Hereinafter, exemplary embodiments of the present invention are described in detail with reference to the accompanying drawings. The same reference numbers are used throughout the drawings to refer to the same or like parts.

The following embodiments will be described based on Bluetooth communication, a Digital Multimedia Broadcasting (DMB) terminal, and a Personal Computer (PC), etc., to better understand the present invention. However, it will be easily appreciated by those skilled in the art that there may be various modifications based on or from the embodiments.

Figure 1:
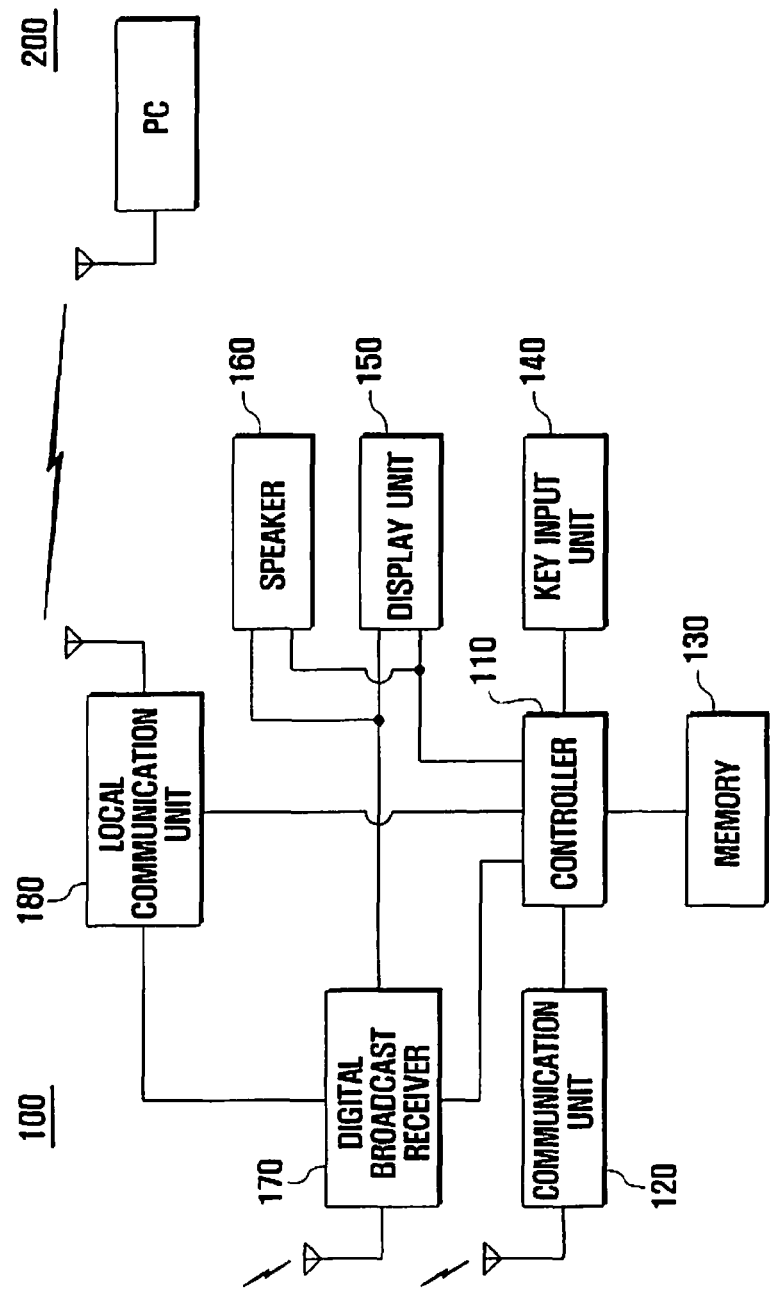
FIG. 1 is a schematic block diagram illustrating a system for displaying received digital broadcast data, according to the present invention.

FIG. 1 is a schematic block diagram illustrating a system for displaying received digital broadcast data, according to an embodiment of the present invention. The system includes a portable terminal 100 having a digital broadcast receiver 170 for changing a service channel and an external device 200 displaying a broadcast signal transmitted from the portable terminal 100.

Referring to FIG. 1, the controller 110 controls the entire operation of the portable terminal 100 including the digital broadcast receiver 170. The key input unit 140 generates key data according to a user's selection and applies it to the controller 110. The user commands generated through the key input unit 140 may generate key data so that it can control the operations of the portable terminal 100 and the digital broadcast receiver 170. The controller 110 includes a data processing unit (not shown). The data processing unit is configured to include: a coder and decoder (CODEC) for encoding a transmission signal and decoding an encoded receive signal; and a modulator and demodulator (MODEM) for modulating the encoded transmission signal and demodulating the modulated receive signal. It should be understood that the data processing unit is separated from the controller 110 and positioned between the communication unit 120 and the controller 110. The controller 110 serves to demodulate and transmit a broadcast signal of a selected broadcast channel when the external device 200 requests a digital broadcast playback. Also, the controller 110 sets or switches a broadcast channel according to the control of the external device 200.

The memory 130 is configured to include a program memory that stores programs for controlling the operations of the digital broadcast receiver 170 and for communicating broadcast information with the external device 200; and a data memory for storing data generated while the programs are executed.

The communication unit 120 serves to perform outgoing and incoming calls of the portable terminal. The communication unit 120 may be configured to include a frequency converter for up-converting the frequency of a transmission signal and down-converting the frequency of a received signal; and a duplexer for separating signals received/transmitted from/to an antenna. Here, the communication unit 120 may be modified to include the data processing unit of the controller 110.

The digital broadcast receiver 170 selects broadcast signals received under the control of the controller 110 to demodulate/decode the selected broadcast signals and then outputs them. The digital broadcast receiver 170 includes a tuner, demodulator, and decoder. The digital broadcast receiver 170 may be implemented with a Digital Multimedia Broadcasting (DMB) receiver or a Digital Video Broadcasting (DVB) receiver. The DMB receiver may be implemented by a terrestrial DMB receiver or a satellite DMB receiver. The DVB receiver may be implemented by a DMB-Terrestrial (DVB-T) receiver or a DVB-Handhelds (DVB-H) receiver.

The short-range communication unit 180 serves to perform short-range communication with the external device 200 under the control of the controller 110. In a preferred embodiment of the present invention, according to the control of the controller 110, the short-range communication unit 180 converts a broadcast signal, output from the digital broadcast receiver 170, into a signal suitable for short-range communication to transmit it to the external device 200, and transmits data generated in the controller 110 to the external device 200. Also, the short-range communication unit 180 serves to receive a signal transmitted from the external device 200 and transmit it to the controller 110. The short-range communication unit 180 may adopt Bluetooth® (hereinafter "Bluetooth") communication, Wireless Broadband (WiBro) communication, WiMax communication, wireless Local Area Network (LAN) communication, and Universal Serial Bus (USB) communication. In an embodiment of the present invention, it is assumed that the short-range communication unit 180 is implemented by a Bluetooth communication unit. When adopting the Bluetooth communication, the portable terminal 100 and the external device 200 must include the Bluetooth communication unit, respectively, and both Bluetooth communication units must be paired to communicate with each other. To perform a short-range communication mode, the Bluetooth communication units establish a communication link to communicate broadcast signals and control information with each other. Here, pairing and establishing the communication link may be achieved through a conventional Bluetooth communication protocol.

The speaker 160 and display unit 150 serve to playback the broadcast signals, output from the digital broadcast receiver 170, and the data of the portable terminal 100, output from the controller 110.

The external device 200 includes a short-range communication unit (not shown) that is operable in the same communication way as that of the portable terminal 100, so that they can communicate with each other. The external device 200 serves to decode and playback a broadcast signal received through its short-range communication unit.

Figure 2:
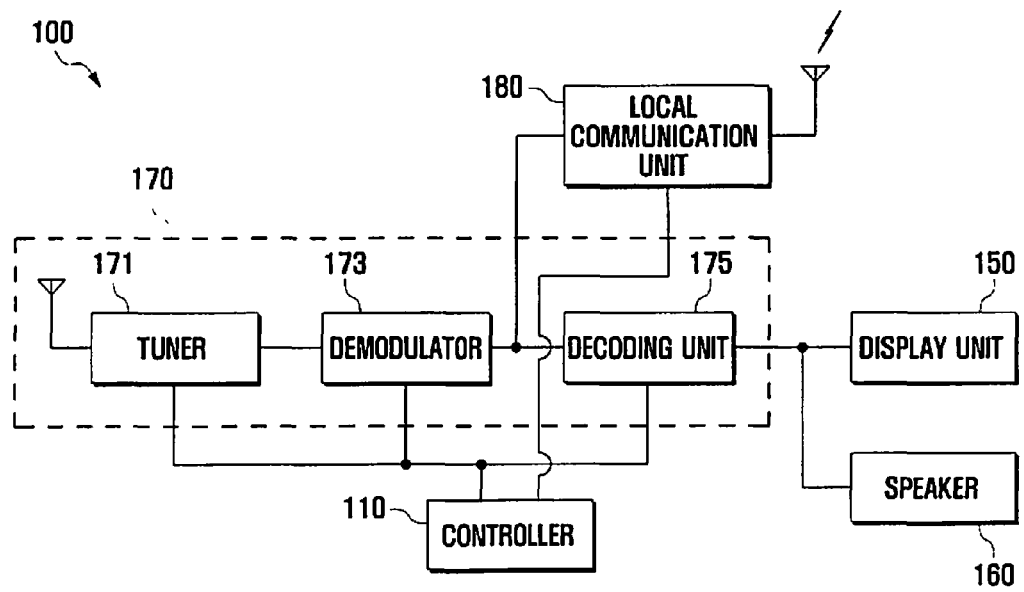
FIG. 2 is a schematic block diagram illustrating a portable terminal of FIG. 1.

FIG. 2 is a schematic block diagram illustrating a portable terminal 100 including a digital broadcast receiver 170 of FIG. 1.

Referring to FIG. 2, the digital broadcast receiver 170 includes a tuner 171 for tuning a frequency of a channel selected by a user and receiving a broadcast signal according to the control of the controller 110; a demodulator 173 for demodulating the broadcast signal of the selected channel frequency; and a decoding unit 175 for extracting audio, video, and broadcast data from the demodulated broadcast signal, and decoding them to output the decoded results through corresponding decoders, respectively.

The demodulator 173 outputs its output to the short-range communication unit 180 to transmit it to the external device 200 according to the control of the controller 110.

To playback a digital broadcast, the controller 110 sets a frequency for a broadcast signal, transmitted through a broadcast channel selected by a user, to the tuner 171. The tuner 171 tunes to the set frequency to receive a broadcast channel signal. The demodulator 173 demodulates the broadcast channel signal to the original signal and outputs it. The decoding unit 175 classifies the demodulated broadcast signal into audio and video signals, and broadcast information, and decodes them through corresponding decoders, respectively. The decoded audio signal is played back through the speaker 160 and the decoded video signal is played back through the display unit 150.

In the present invention, the controller 110 transmits the broadcast information of the digital broadcast receiver 170 to the external device 200, and controls the operation of the digital broadcast receiver 170. When the controller 110 receives a command requesting digital broadcast playback from the external device 200 through the short-range communication unit 180, the controller 110 identifies broadcast channels selected by the external device 200; transmits identification information about a corresponding broadcast channel to the external device 200 through the short-range communication unit 180; and controls the tuner 171 to set a frequency channel that the selected broadcast channel signals can be received. Also, the controller 110 controls the short-range communication unit 180 that the demodulated broadcast signal output from the demodulator 173 can be transmitted to the external device 200. The controller 110 may or may not transmit the demodulated signal output from the demodulator 173 to the decoding unit 175. Specifically, when the digital broadcast signal is played back through the external device 200, the decoding unit 175 of the portable terminal may be selectively controlled during the operation.

The digital broadcast receiver 170 described above may be modified according to broadcasting modes. The digital broadcast receiver 170 may adopt DMB or DVB. The DMB includes terrestrial DMB (DMB-T) or satellite DMB. The DVB includes DVB-T or DVB-H. Broadcast data in the DMB and DVB is transmitted in an MPEG2-transport stream (MPEG2-TS) structure. The broadcast data of MPEG2-TS structure is packet streams where each packet includes a packet header and a payload. The packet header includes Packet IDentification (PID) information to identify broadcast channels. Therefore, the digital broadcast receiver 170 can select a broadcast channel using the PID information. The payload of each packet with an MPEG2-TS structure is filled with broadcast signals (for example, audio, video, and broadcast data) for the DMB and DVB_T and with Internet Protocol (IP) information and the broadcast signals for the DVB-H. Therefore, the demodulator 173 demodulates service channel data to generate MPEG2-TS. The MPEG2-TS signal demodulated in the demodulator 173 is outputted to the short-range communication unit 180 and/or to the decoding unit 175. Here, the MPEG2-TS signal is a type of compressed encoded signal, and thus the broadcast signal transmitted through the short-range communication unit 180 also becomes a type of compressed encoded signal. Therefore, since the compressed encoded broadcast signal is transmitted from the short-range communication unit 180 to the external device 200, a decoded broadcast signal can be transmitted at a high transmission rate, and thus the total transmission rate of the broadcast signals can be enhanced, as well.

The decoding unit 175 is configured to classify broadcast information and audio and video signals. The decoding unit 175 includes a plurality of decoders that decode the broadcast information and audio and video signals, respectively. Here, the classification configuration of the decoding unit 175 may be implemented with a demultiplexer for DMB and DVB-T or with an IP decapsulator for DVB-H. In this case, the demultiplexer or IP decapsulator classifies audio and video signals and broadcast information of a selected broadcast channel from the MPEG2-TS stream output from the demodulator 173. The decoding unit 175 may further include audio, video, and broadcast information decoders. Here, the broadcast information may include broadcast program information, and a variety of image information related to the broadcast. The broadcast information may further include interactive information allowing a viewer to participate in a broadcast program. For example, the broadcast information may include an Electronic Program Guide (EPG) for DMB and an Electronic Service Guide (ESG) for DVB-H.

The controller 110 of the portable terminal 100 can receive operation control commands for the digital broadcast receiver 170 through the key input unit 140 from a user and/or through the short-range communication unit 180 from the external device 200. To playback the output of the digital broadcast receiver 170 through the external device 200, the controller 110 transmits an identifier of a selected broadcast channel (PID information, etc.) to the external device 200 through the short-range communication unit 180. The external device 200 demultiplexes video and audio signals of the selected broadcast channel from demodulation signals that are received according to the identification information of the selected broadcast channel, and also extracts the broadcast information from the received demodulation signals. Therefore, the video and audio signals and broadcast information can be decoded through corresponding decoders, respectively, and then played back.

When an incoming or outgoing call function is set to be available while the digital broadcast signals are played back through the external device 200, the controller 110 can transmit the output of the digital broadcast receiver 170 to the external device 200 and, simultaneously, provide the incoming or outgoing call function.

Figure 3:
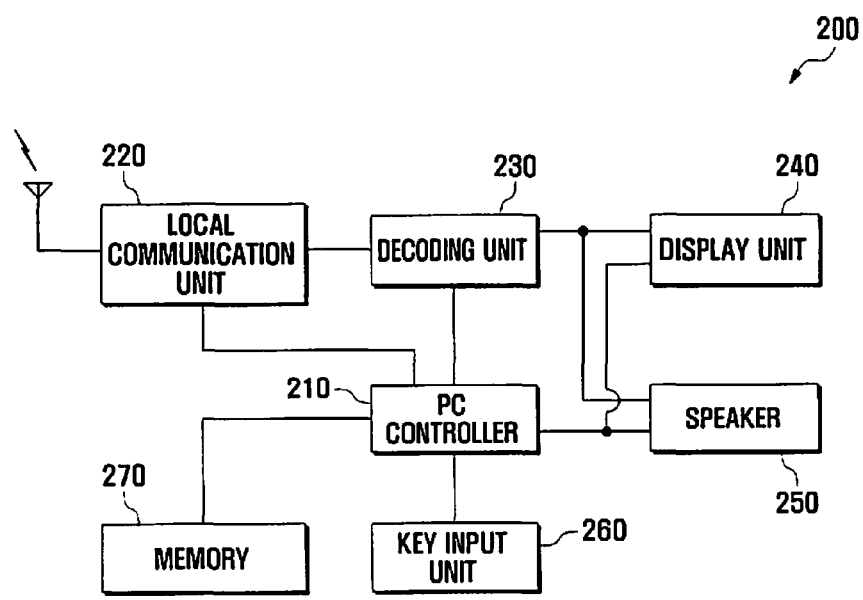
FIG. 3 is a schematic block diagram illustrating an external device of FIG. 1.

FIG. 3 is a schematic block diagram illustrating an external device 200 of FIG. 1, which plays back digital broadcast signals transmitted from the portable terminal 100. The external device 200 may be implemented with a Personal Computer (PC).

Referring to FIG. 3, when inputting a digital broadcast playback request through a key input unit 260, a PC controller 210 transmits it to the portable terminal 100 through a short-range communication unit 220. When inputting commands, such as a broadcast channel switch, broadcasting termination, and recording, etc., pass through the key input unit 260 during the digital broadcast playback, the PC controller 210 transmits them to the portable terminal 100 through the short-range communication unit 220.

When the digital broadcast playback mode is set, the short-range communication unit 220 receives a demodulated broadcast channel signal and a decoding unit 230 decodes the demodulated broadcast signal to generate audio and video signals and broadcast information, such that the decoded audio signal is played back through a speaker 250 and the decoded video signals is played back through a display unit 240. The decoded broadcast information is stored in a memory 270 that it can be played back through the display unit 240 and the speaker 250 according to the control of the PC controller 210.

The portable terminal 100 controls the operation of the digital broadcast receiver 170 to play a received broadcast signal back. When the digital broadcast signal is played back through the external device 200, the portable terminal 100 outputs a demodulated broadcast signal of the digital broadcast receiver 170 through the short-range communication unit 180. The external device 200 receives the demodulated broadcast signals through the short-range communication unit 220 and decodes the received broadcast signal through a decoding unit 230 to play it back. Here, the external device 200 may generate and transmit a control command for controlling the operation of the digital broadcast receiver 170 to the portable terminal 100. When receiving the control command, the portable terminal 100 controls the digital broadcast receiver 170 and transmits its state information to the external device 200.

The decoding unit 230 of the external device 200 may be modified to various forms as follows, depending on broadcast signals transmitted for the portable terminal 100.

First, when the broadcast signal transmitted from the portable terminal 100 is a demodulated MPEG2-TS stream structure, the decoding unit 230 may be configured to include a demultiplexer or an IP decapsulator, and decoders for audio and video signals and broadcast information. The decoding unit 230 may employ a decoder of DMB when the digital broadcast receiver 170 is implemented by a DMB receiver and a decoder of DVB-H when the digital broadcast receiver 170 is implemented by a DVB-H receiver. In addition, the decoding unit 230 may be configured to include both the decoder of DMB and decoder of DVB-H to selectively decode broadcast signals according to the types of the digital broadcast receiver 170.

Second, when the broadcast signal transmitted from the portable terminal 100 undergoes demodulating, demultiplexing, and IP-decapsulating to be classified into audio and video signals and broadcast information that are to transmitted, the decoding unit 230 may be configured to include decoders for audio and video signals and broadcast information. The decoding unit 230 includes an audio decoder, video decoder, and broadcast information decoder, such that the respective decoders decode encoded audio signal, encoded video signal, and encoded broadcast information, transmitted from the portable terminal 100, based on corresponding decoding methods. The decoding unit 230 may include a plurality of audio, video, and broadcast information decoders for decoding data that was encoded based on DMB and DVB-H. The decoding unit 230 may be operated in a way that the audio, video, and broadcast information decoders are selected depending on which type of data is output from the digital broadcast receiver 170 of the portable terminal 100 under the control of the PC controller 210 of the external device 200, and the selected decoders decode the received encoded data.

Third, when the portable terminal 100 transmits the broadcast signals to the external device 200 in demodulated and decoded as broadcast data (or raw data), the decoding unit 230 of the external device 200 is not used. In this case, the external device 200 just processes audio and video signals and broadcast information, and skips the decoding process.

While the external device 200 plays the digital broadcast signal back, the portable terminal 100 can process incoming and outgoing calls. This is because the portable terminal 100 has just set the route for the digital broadcast signal. Therefore, the portable terminal 100 can establish a communication route that incoming and outgoing call can be processed through the communication unit 120, independent of the digital broadcast receiver 170. In this case, a portable terminal's user can view a digital broadcast played back through the external device 200 and perform communication using his/her portable terminal 100. Here, the route for a voice call and data communication is established, independent of the digital broadcast currently being played back.

When the external device 200 plays back the digital broadcast signal received by the portable terminal 100, it can communicate control commands and broadcast signals with the portable terminal 100, in short-range communication. Short-range communication includes short-range wireless communication and short-range wired communication. The short-range wireless communication includes Bluetooth communication and Zigbee communication, and the short-range wired communication includes USB communication. In the following description, it is assumed that an embodiment of the present invention employs the USB communication and the digital broadcast receiver 170 is a DMB receiver.

The portable terminal 100 and the external device 200 communicate with each other through their short-range communication units 180 and 220, in a short-range communication. For example, the external device 200 communicates commands for controlling operations of the digital broadcast receiver 170 of the portable terminal 100 and reply information corresponding to the commands with the portable terminal 100 through their short-range communication units 180 and 220. While the external device 200 plays back the digital broadcast, when the portable terminal 100 transmits its status information to the external device 200 through the short-range communication unit 180, the external device 200 receives the status information through the short-range communication unit 220 and displays it thereon.

FIGS. 4A and 4B show streams of the short-range communication units 180 and 220 through which the portable terminal 100 and external device 200 communicate digital broadcast signals and control information with each other. Table 1 describes types of information that the external device 200 transmits to the portable terminal 100 and types of information that the portable terminal 100 replies to respective types of information of the external device 200. Table 2 describes types of information that the portable terminal 100 transmits to the external device 200.

TABLE 1

| PC -> Phone | | | | |
|---|---|---|---|---|
| DMB_PKT_TYPE_REQ | DMB_SUBCMD_XXXX | Parameter | | |
| 0x10 | 0x01: Kick | — | | |
| | 0x02: Start | — | | |
| | 0x03: Stop | — | | |
| | 0x04: Resume | — | | |
| | 0x05: Pause | — | | |
| | 0x06: Main Set Channel | Main Ch. (2 byte), Sub. Ch. (2 byte) | | |
| | 0x07: Get Channel | — | | |
| | 0x08: EPG Data | — | | |
| | 0x09: PIP Mode Set | 0x01: PIP Free, 0x02: PIP Set | | |
| | 0xOA: Main Sub Change | Main Ch. (2 byte), Sub. Ch. (2 byte) Main Ch. | | |
| | 0xOB: Sub Set Channel | (2 byte), Sub. Ch. (2 byte) | | |
| PC <- USB in Phone | | PC <- Phone | | |
| DMB_PKT_TYPE_ACK | DMB_PKT_TYPE_RES | DM_PKT_TYPE_XXX | Parameter | |
| 0x20 | 0x30 | 0x07: DMB Mode | 0x00: SDMB, 0x01: TDMB | |
| | | 0x08: PIP Support | 0x00: Not Support, 0x01: Support | |
| | | 0x09: PIP Set | 0x09: PIP Free, 0x01: PIP Set | |

TABLE 2

| PC <- Phone DMB_PKT_TYPE_NOTI | DMB_NOTI_XXXX | Parameter | PC <- Phone DMB_PKT_TYPE_STRM |
|---|---|---|---|
| 0x40 | 0x(H): RSSI Low | — | 0x50 |
| | 0x01: Slopped Ch. | — | |
| | 0x02: Extra Fee | — | |
| | 0x03: Not View Rale | — | |
| | 0x04: Adult Certi. | — | |
| | 0x05: Batt. Low | — | |
| | 0x06: SDMB Binary Err. | — | |
| | 0x07: Non Favorite Ch. | — | |
| | 0x08: Pasted Favorite Ch. | — | |
| | 0x09: Previous Ch. Pasted | — | |
| | 0x31: Outgoing Call | — | |
| | 0x32: Incoming Call | — | |
| | 0x33: Receive SMS | — | |
| | 0x34: Send SMS | — | |
| | 0x35: Call Conned | — | |
| | 0x36: Call End | — | |
| | 0x37: Reserve Alarm | — | |
| | 0x38: Message Box | — | |
| | 0x3C: Volume Up | — | |
| | 0x3D: Volume Down | — | |
| | 0x3E: Mule | — | |
| | 0x41: Ch. Select Success | Main Ch. (2byte), Sub. Ch. (2byte) | |
| | 0x42: Ch. Select Fail | — | |
| | 0x65: Start ACK | — | |
| | 0x66: End ACK | — | |
| | 0x67: Event CMD | — | |
| | 0x68: EIT Data | — | |
| | 0x69: Player Terminate | — | |
| | 0x6A: Pause or Resume | — | |
| | 0x6B: Sensitivity | RSSI level (0x00-0x06) | |
| | 0x6C: Ch. Change | Ch. Mode (2byte), Change Ch. Number (2byte) | |
| | 0x6D: Pf Data | — | |
| | 0x6E: PIP Mode Set | 0x00: PIP Free, 0x01: PIP Set | |
| | 0x6F: PIP Main Sub. Change | Main Ch. (2byte), Sub. Ch. (2byte) | |
| | 0x70: Bait. Level CMD | Battery Level (0x00-0x03) | |
| | 0xC8: EPG Info. | Main Ch. (2byte), Sub. Ch. (2byte) | |

The stream structure shown in FIG. 4A is employed by the stream transmitted and received between the external device 200 and the portable terminal 100. The stream structure has a main Command (main CMD) field and a sub Command (sub CMD) field. The main CMD and sub CMD are commands for notifying an opposite party of digital broadcasting and a control and state of a portable terminal.

The main CMD may be a command to indicate types of transmission sides and transmitted information. For example, as described in Table 1 and Table 2, the main CMD is 0x10, 0x20, 0x30, 0x40, and 0x50. The 0x10 is indicative of information on a digital broadcast control request, DMB_PKT_TYPE_REQ, which is transmitted from the external device 200 to the portable terminal 100. The 0x20 is indicative of information that the short-range communication unit replies to with, DMB_PKT_TYPE_ACK. The 0x30 is indicative of replay information, DMB_PKT_TYPE_RES, in response to the request information transmitted from the portable terminal 100 to the external device 200. The 0x40 is indicative of information, DMB_PKT_TYPE_NOTI, which notifies the external device 200 of a status of the portable terminal 100 while the digital broadcast function is performing. The 0x50 is indicative of stream transmitted from the portable terminal 100 to the external device 200.

The sub CMD is indicative of information to be substantially processed through messages transmitted to the main CMD. Parameters may be information for executing the sub CMD. The parameters may exist or may not exist, depending on the sub CMD.

When a call and a message occur, Call/SMS data may be information to be displayed on the external device 200, indicating that the call and the message are generated in the portable terminal 100. When the portable terminal 100 transmits the Call/SMS data to the external device 200 in the stream shown in FIG. 4A, the sub CMD is effective provided that it is 0x31-0x34 described in Table 2. Payload is indicative of a digital broadcast signal that may be demodulated video and audio signals and/or broadcast information (for example, Electronic Program Guide (EPG)). When the portable terminal 100 transmits streams to the external device 200, the main CMD may be an EPG provided that it is 0x50 described in Table 2.

FIG. 4B shows a stream structure in the case that the information of the payload is an EPG.

The stream transmitted from the external device 200 to the portable terminal 100 includes a variety of control information related to digital broadcast playback, such as start, stop, and pause, etc., and other information related to selection of digital broadcast channel, Picture in Picture (PIP) function selection, channel switch and control, etc., as described in Table 1. The portable terminal 100 transmits the followings to the external device 200, which is information related to the types and performance of digital broadcast receivers, such as types of DMB (a satellite DMB and a terrestrial DMB), and whether a PIP function is provided. When receiving the information, the external device 200 identifies the type of DMB and sets audio, video, and broadcast information decoders of the decoding unit 230. While performing the digital broadcasting function, the portable terminal 100 transmits its status information and a variety of information related to the digital broadcast receiver 170 to the external device 200. As described in Table 2, the stream transmitted from the portable terminal 100 to the external device 200 includes status of the portable terminal 100, user's preference of digital broadcast channel, information related to call and message communication, operation control of digital broadcast receivers, and a variety of information related to digital broadcasting.

Figure 5:
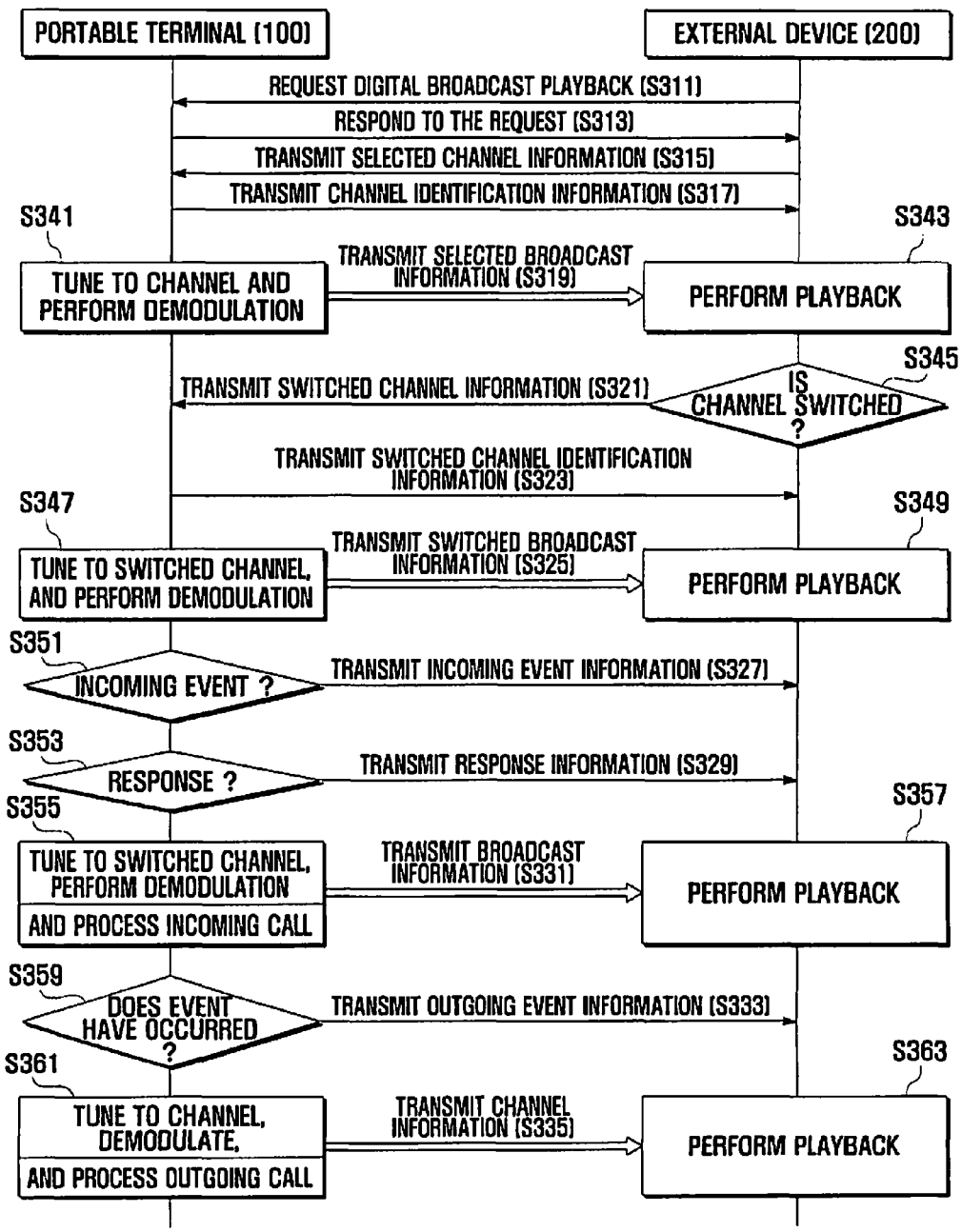
FIG. 5 is a flow chart illustrating a procedure of displaying digital broadcast signals through the operation of a portable terminal including a digital broadcast receiver and an external device, according to the present invention.

FIG. 5 is a flow chart illustrating a procedure of performing digital broadcast playback and communication between the portable terminal 100 and the external device 200. In an embodiment of the present invention, it is assumed that the digital broadcast receiver 170 of the portable terminal 100 adopts DMB. Here, the DMB includes terrestrial DMB and satellite DMB. The terrestrial DMB allows a terrestrial broadcast transmitter to identify channels based on respective frequencies. The broadcast channels are identified by the frequency channels. In the terrestrial DMB, signals of a plurality of broadcast channels are transmitted through one channel frequency in packets. These broadcast channels are identified by broadcast channel identifiers, such as PID. The broadcast channel identifier may include broadcast information. In an embodiment of the present invention, it is assumed that the broadcast information includes identifiers of respective broadcast channels. The following will be described under the assumption that the identification information of the broadcast channel includes a channel frequency and PID, etc. Also, the following will describe a procedure where frequency channel and broadcast channel identifiers are set when a broadcast channel is selected.

The information communicated between the portable terminal 100 and the external device 200 has the structure as shown in FIGS. 4A and 4B. Also, the information transmissible between the portable terminal 100 and the external device 200 has the structure as described in Tables 1 and 2.

Referring to FIGS. 4A, 4B, and 5, a digital broadcast playback may be requested through the portable terminal 100 or the external device 200. FIG. 5 shows a case where a digital broadcast playback request is created through the external device 200. When a command of the digital broadcast playback request is generated in the external device 200, the PC controller 210 of the external device 200 transmits the playback request command (main CMD: 0x10 and sub CMD: 0x02 in Table 1) to the portable terminal 100 at step S311. The portable terminal 100 receives the playback request command and then transmits a reply signal (main CMD: 0x30 sub CMD: 0x07, and parameter: 0x00 (SDMB) in Table 1) to the external device 200 at step S313. In response to the reply signal, the external device 200 reads the type of the digital broadcast receiver 170 of the portable terminal 100 and then selects proper decoders in the decoding unit 230. When the digital broadcast receiver 170 is SDMB, the external device 200 selects audio, video, and broadcast information decoders adopting SDMB in the decoding unit 230. On the contrary, when the digital broadcast receiver 170 is TDMB, the external device 200 selects audio, video, and broadcast information decoders adopting TDMB in the decoding unit 230. After that, the external device 200 transmits information (main CMD: 0x10, sub CMD: 0x06, and parameter (main ch. sub.ch) in Table 1) of a broadcast channel selected by a user to the portable terminal 100 at step S315. The portable terminal 100 transmits identification information (main CMD: 0x40, sub CMD: 0x41, and parameter (main ch. sub.ch.) in Table 1) of the selected broadcast channel to the external device 200 at step S317. The external device 200 sets the selected broadcast channel based on the received channel identification information. The channel identification information may be PID or a channel number of a selected broadcasting as shown in FIG. 5. When the channel identification information employs PID, the portable terminal 100 transmits a demodulated broadcast signal to the external device 200, and then the external device 200 separates audio and video signals and broadcast information from the demodulated broadcast signal to decode them using its demultiplexer. When the channel identification information employs a channel number, the portable terminal 100 separates audio and video signals and broadcast information from a demodulated broadcast signal to transmit them to the external device 200, and then the external device 200 decodes the received signals, respectively. After that, the portable terminal 100 tunes a channel frequency of the broadcast channel to a tuner 171 of a corresponding digital broadcast 170, and allows the demodulator 173 to demodulate the broadcast signals received through the tuner 171 at step S341. The demultiplexer can separate audio and video signals and broadcast information from the demodulated broadcast signals. The portable terminal 100 transmits the demodulated broadcast signal (main CMD: 0x50, TS data in Table 1) to the external device 200 through its short-range communication unit 180, and then the external device 200 receives them through its short-range communication unit 220 at step S319. The external device 200 decodes the received audio and video signals to play them back through the display unit 240 and the speaker 250, respectively at step S343. Here, the extraction and decoding of the audio and video signals are performed by the decoding unit 230 of the external device 200.

When the digital broadcast playback mode is performed, the portable terminal 100 transmits the demodulated digital broadcast signals to the external device 200, and the external device 200 decodes the received signals to audio and video signals of the selected broadcast channel to play them back. The display unit 240 of the external device 200 is relatively larger than the display unit 150 of the portable terminal 100. The digital broadcast signal that the portable terminal 100 receives is set to the display standard of the portable terminal 100, which is approximately 7 inches in size. However, the external device 200, such as a computer, has a display unit greater than that of the display unit 150 of the portable terminal 100. The external device 200 can then display the broadcast on its entire screen or in a portion of area on the display unit 240. When displaying the broadcast on a portion of area on the display unit 240, the external device 200 can also display receiving broadcast information on other areas of the display unit 240, not just on the portion stated above. The receiving broadcast information includes EPG or ESG, etc. On the contrary, when displaying the broadcast on the entire screen on the display unit 240, the PC controller 210 of the external device 200 interpolates the video signal and displays it on the entire screen. To display the broadcast information and the broadcast signals together, the PC controller 210 of the external device 200 may display menus for the broadcast information so that a user can select them, and, when the user selects a menu, display the selected broadcast information. The menus of broadcast information serve to display: broadcast program information of respective broadcast channels through which broadcast programs are broadcast at times selected by a user; broadcast programs of broadcast channels that the user has selected; broadcast channels, through which broadcast programs of specific genres that the user has selected are broadcast, and information about the broadcast programs; and broadcast program information about all broadcast channels.

While the broadcast of the user's selected channel is playing back, the user can switch the channel to another broadcast cannel. In this case, the user can generate a broadcast channel switch signal through the portable terminal 100 or the external device 200. A generated switch signal serves to switch broadcast channel numbers. When the channel switch command is generated through the key input unit 260 of the external device 200, the PC controller 210 of the external device 200 detects the command at step S345. The PC controller 210 transmits broadcast information (main CMD: 0x10, sub CMD: 0x0A, and parameter (main ch. sub. ch) in Table 1) about a channel, to which a current channel is switched, to the short-range communication unit 220 at step S321. The short-range communication unit 220 modulates the received switched channel information to transmit it. The controller 110 of the portable terminal 100 reads that the modulated information received through its short-range communication unit 180 corresponds to channel switch, and sets up a channel frequency so that the tuner 171 of the digital broadcast receiver 170 can receive broadcast signals through the switched channel. After that, the controller 110 transmits the identification information of the switched channel to the external device 200 at step S323. The external device 200 identifies the identification information and sets the decoding unit 230 based on the identification information so that audio and video data of the switched broadcast channel can be selected. When the PC controller 210 of the external device 200 is configured to determine identifiers of the broadcast channel, step S323 described above can be omitted.

After that, the portable terminal 100 tunes the channel frequency of the broadcast channel to the tuner 171 of a corresponding digital broadcast receiver 170 and demodulates the broadcast signals received through the tuner 171 at step S347. The portable terminal 100 demultiplexes the demodulated broadcast signals and separates audio, video, and broadcast information therefrom to transmit them to the external device 200 through the short-range communication unit 180 at step S325. The external device 200 decodes the audio and video signals of a selected broadcast channel, received through its short-range communication unit 220, and plays them back through the display unit 240 and the speaker 250, respectively, at step S349. Here, the audio and video signals are decoded by the decoding unit 230 of the external device 200.

When a communication event occurs while the external device 200 is playing back the digital broadcast signals that the portable terminal 100 has received, the portable terminal 100 processes the generated communication event. The communication event may be an incoming event or an outgoing event. The incoming event may occur when a call or a message is received, and the outgoing event may occur when an outgoing call function (a call or a message) is selected.

First, the following describes a procedure for processing an incoming event.

When an incoming event has occurred, the controller 110 of the portable terminal 100 detects it at step S351. After that, the controller 110 warns the incoming event generation and transmits the incoming event information (main CMD: 0x40, sub CMD: 0x32, and CallSMSdata in Table 1) to the external device 200, through its short-range communication unit 180, at step S327. The incoming event information of the portable terminal 100 is implemented to be displayed through the display unit 150 and to output a warning sound through the speaker 160, simultaneously. Here, the incoming event information includes a caller name and phone number. Since the external device 200 plays back the digital broadcast, the portable terminal 100 sounds a warning through its speaker 160. It should be understood that the controller 110 of the portable terminal 100 does not sound a warning through the speaker 160. In that case, when the incoming event has occurred, the external device 200 displays the outgoing event information, transmitted from the portable terminal 100, on its display unit 240. Therefore, through the incoming warning sound of the portable terminal 100 and/or the indication of the incoming event information displayed on the display unit 240 of the external device 200, a user can recognize that the incoming event has occurred. Response to the incoming event can be processed through the portable terminal 100 or external device 200. In an embodiment of the present invention, it is assumed that the response is processed by the portable terminal 100. When the user responds to the incoming event, the portable terminal 100 detects the response at step S353. The portable terminal 100 transmits the user's response information (main CMD: 0x40, sub CMD: 0x35 in Table 1) to the external device 200 at step S329 and processes the incoming event at step S355. Here, the incoming event includes an incoming call or incoming message process.

While the incoming event is processing, the controller 110 of the portable terminal 100 controls the digital broadcast receiver 170, demodulates the received broadcast signals, and keeps transmitting the result information (main CMD: 0x50, TS data in Table 1) to the external device 200. Therefore, the external device 200 can keep playing back the broadcast signals of a selected broadcast channel while the portable terminal 100 is processing the incoming event.

Second, the following describes a procedure for processing an outgoing event.

When an outgoing event has occurred, the controller 110 of the portable terminal 100 detects it at step S359. After that the controller 110 transmits the outgoing event information to the external device 200 through the short-range communication unit 180 at step S333. In that case, the portable terminal 100 and external device 200 display the outgoing event information (man CMD: 0x40, sub DMD: 0x31, and CallSMSdata in Table 1) on the display units 150 and 240, respectively, and then process the outgoing event.

While the outgoing event is processing, the controller 110 of the portable terminal 100 controls the digital broadcast receiver 170, demodulates the received broadcast signals, and keeps transmitting the result information (main CMD: 0x50, TS data in Table 1) to the external device 200. Therefore, the external device 200 can keep playing back the broadcast signals for a selected broadcast channel while the portable terminal 100 is processing the incoming event.

Figure 6:
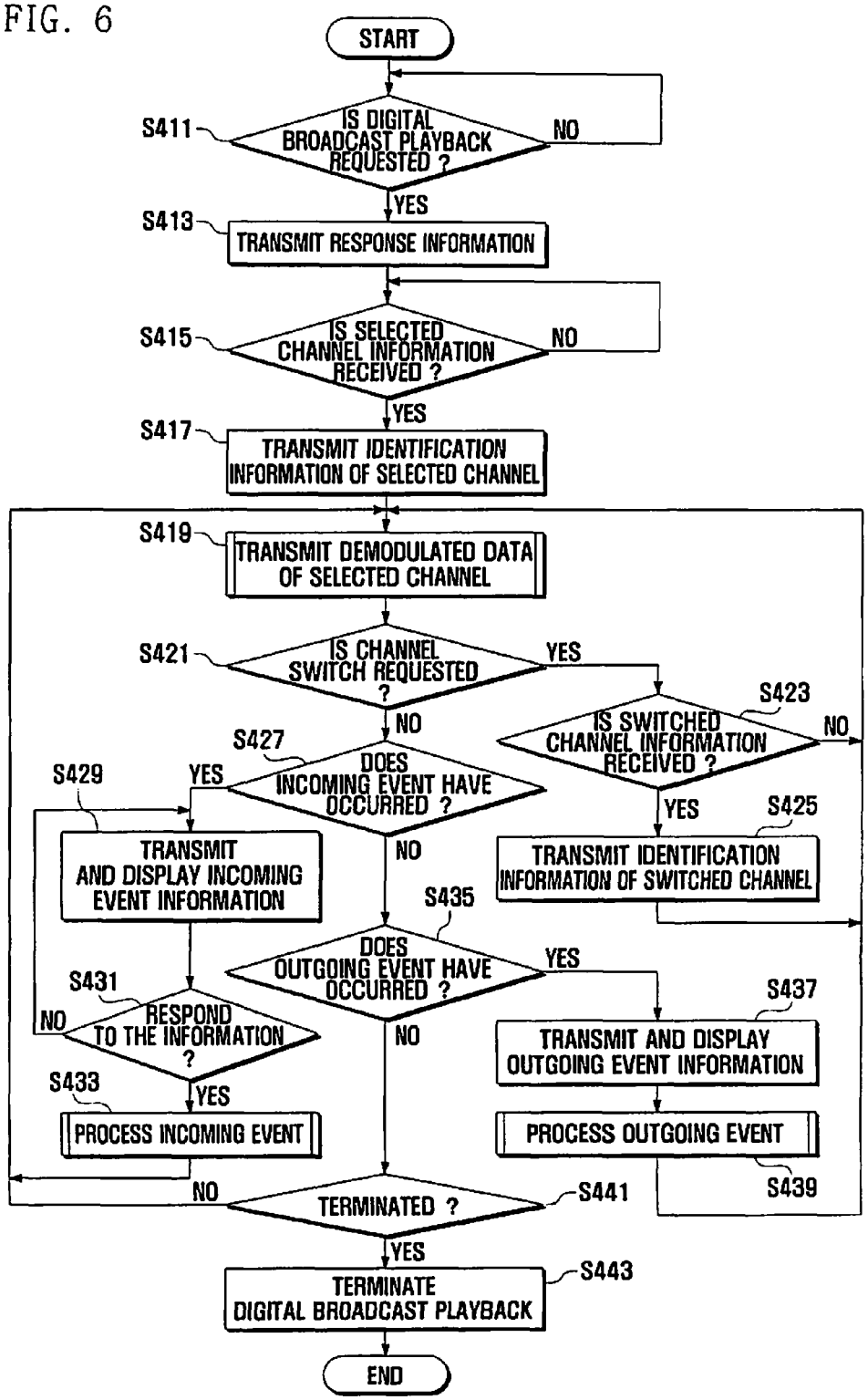
FIG. 6 is a flow chart illustrating the operation of the portable terminal of FIG. 5.

FIG. 6 is a flow chart illustrating a procedure for controlling the portable terminal 100 while digital broadcast signals are transmitted from the portable terminal 100 to the external device 200, according to an embodiment of the present invention.

Referring to FIG. 6, when a digital broadcast playback request has occurred in the external device 200, the controller 110 of the portable terminal 100 detects the request at step S411 and transmits response information thereto at step S413. When the portable terminal 100 receives channel selection information from the external device 200, the controller 110 detects the information at step S415, and transmits identification information of the selected channel to the external device 200 through the short-range communication unit 180 at step S417. The controller 110 controls the digital broadcast receiver 170 to set up a frequency of the selected broadcast channel. After that, the controller 110 controls the digital broadcast receiver 170 and short-range communication unit 180 and demodulates received broadcast channel signals to transmit them to the external device 200. The external device 200 receives, decodes, and plays back the broadcast signals transmitted from the portable terminal 100.

While playing back the digital broadcast signals, the external device 200 can generate a channel switch command. When generating the channel switch command, the external device 200 transmits it to the portable terminal 100 through the short-range communication unit 220. The controller 110 determines whether the channel switch is requested at step S421. When the cannel switch is requested, the controller 110 controls the digital broadcast receiver 170 to switch the broadcast channel, according to requested channel information at step S423, and controls the short-range communication unit 180 to transmit identification information about the switched broadcast channel to the external device 200 at step S425. After that, the procedure is returned to step S419.

While receiving the digital broadcast signals, when an incoming event occurs at the portable terminal 100, the controller 110 detects it at step S427. The controller 110 transmits the incoming event information to the external device 200 and indicates that the incoming event has occurred, through the display unit 150 and/or speaker 160, at step S429. Also, the external device 200 is implemented in a way as indicate or not to indicate that the incoming event has occurred through the display unit 240 and/or the speaker 250 when the incoming event information is received. The incoming event of the portable terminal 100 may be implemented to generate or not generate an incoming warning sound. The controller 110 checks whether the incoming event is processed at step S431. When the incoming event has been processed, the controller 110 processes the incoming event at step S433. The incoming event is processed through the procedure described in FIG. 7.

Figure 7:
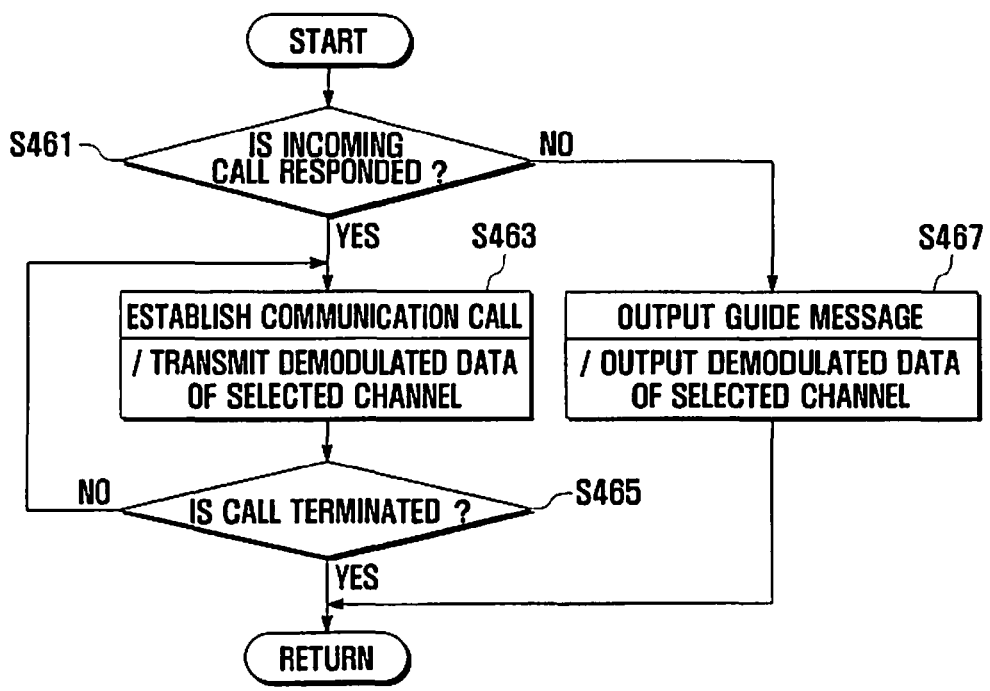
FIG. 7 is a flow chart illustrating a procedure for processing an incoming call in FIG. 6.

Referring to FIG. 7, when an incoming response is generated, the controller 110 of the portable terminal 100 detects it at step S461 and processes the incoming call at step S463. Also, the controller 110 controls the digital broadcast receiver 170 and the short-range communication unit 180, and transmits demodulated signals of a selected broadcast channel to the external device 200. The incoming call may be continuously processed until the call is terminated at step S465. Also, the controller 110 controls the communication unit 120 and establishes a call when responding to the incoming response at step S463. Also, the controller may control the digital broadcast receiver 170 to temporarily stop transmitting the digital broadcast signal. In this case, the digital broadcast signals stops being transmitted to the external device 200 while the incoming call is processed. When the incoming call is ended, the controller 110 controls the digital broadcast receiver 170 to resume the playback of the broadcast channel that had been provided before the incoming call was processed.

In addition, the external device 200 outputs the states of the incoming call to the display unit 150 and speaker 160, according to a user's setting, in video (image and/or test data) and audio (voice, sound or music). Also, the external device 200 may be implemented in a way that video is displayed through the display unit 150 or the states of the incoming call are not displayed. Therefore, when the external device 200 receives the incoming event information of the portable terminal 100 through the short-range communication unit 220, it displays the incoming event based on the setting of the portable terminal 100 and, simultaneously, processes the received digital broadcast signals to display them. Here, the incoming event information includes a caller name and phone number.

When displaying the incoming event information at step S429, the portable terminal 100 may not respond to the incoming event. While performing a digital broadcast playback mode according to a user's selection, the portable terminal 100 may display a message inquiring whether the termination will be denied, when an incoming call event is displayed at time when an incoming call is generated. When an incoming rejection is selected, the controller 110 detects it at step S461, outputs a guide message to notify that the portable terminal 100 cannot be picked up at step S467, and then terminates the incoming call. And, the controller 110 transmits broadcast channel information processed by the digital broadcast receiver 170 to the external device 200 to continue playing back the digital broadcast.

When the incoming event is messages from services, such as Short Message Service (SMS), E-mail Message Service (EMS), and Multi-media Message Service (MMS), etc., the controller 110 transmits information about a received message through the short-range communication unit 180. When the received message is a text message, the controller 110 may transmit the received text message to the external device 200. When the received message is a message including attached files such as an EMS or MMS, the controller 100 displays incoming information about the message and may provide the incoming message according to a user's selection.

When the incoming event has occurred while the digital broadcast signals are playing back in the external device 200, the portable terminal 100 can process the incoming event independent of the digital broadcast. Here, the incoming event includes an incoming call and an incoming message event.

The portable terminal 100 can process an outgoing event while receiving the digital broadcast signals. When the outgoing event has generated, the controller 110 detects it at step S435. Next, the controller 110 transmits the outgoing event information to the external device 200 to display it through both the external device 200 and the portable terminal 100 at step S437. After that, the controller 110 processes the generated outgoing event at step S439 through the procedure as described in FIG. 8.

Figure 8:
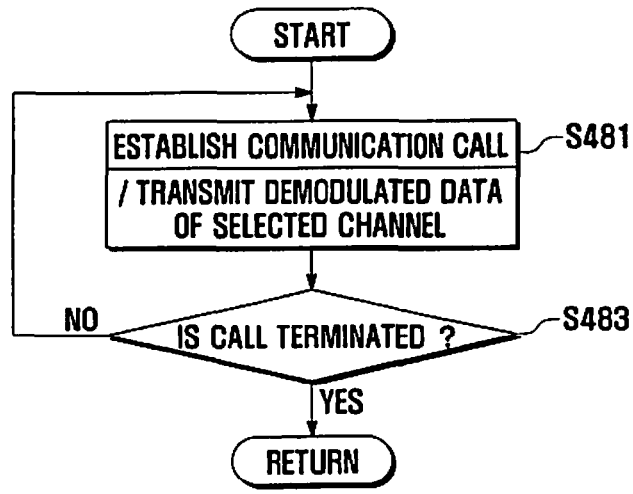
FIG. 8 is a flow chart illustrating a procedure for processing an outgoing call in FIG. 6.

Referring to FIG. 8, the controller 110 processes an outgoing call according to the outgoing event, and controls the digital broadcast receiver 170 and the short-range communication unit 180 to transmit demodulated signals of the selected broadcast channel to the external device 200 at step S481. This process may be repeated until the call is terminated at step S483. When the outgoing event has been generated while the digital broadcast signals are playing back in the external device 200, the portable terminal 100 can process the outgoing event independent of the digital broadcast. Here, the incoming event includes an outgoing call and an outgoing message event.

While paying the digital broadcast back in FIG. 6, when a termination command is inputted, the controller 110 receives the termination command at step S441, and terminates the digital broadcast playback at step S443.

Figure 9A:
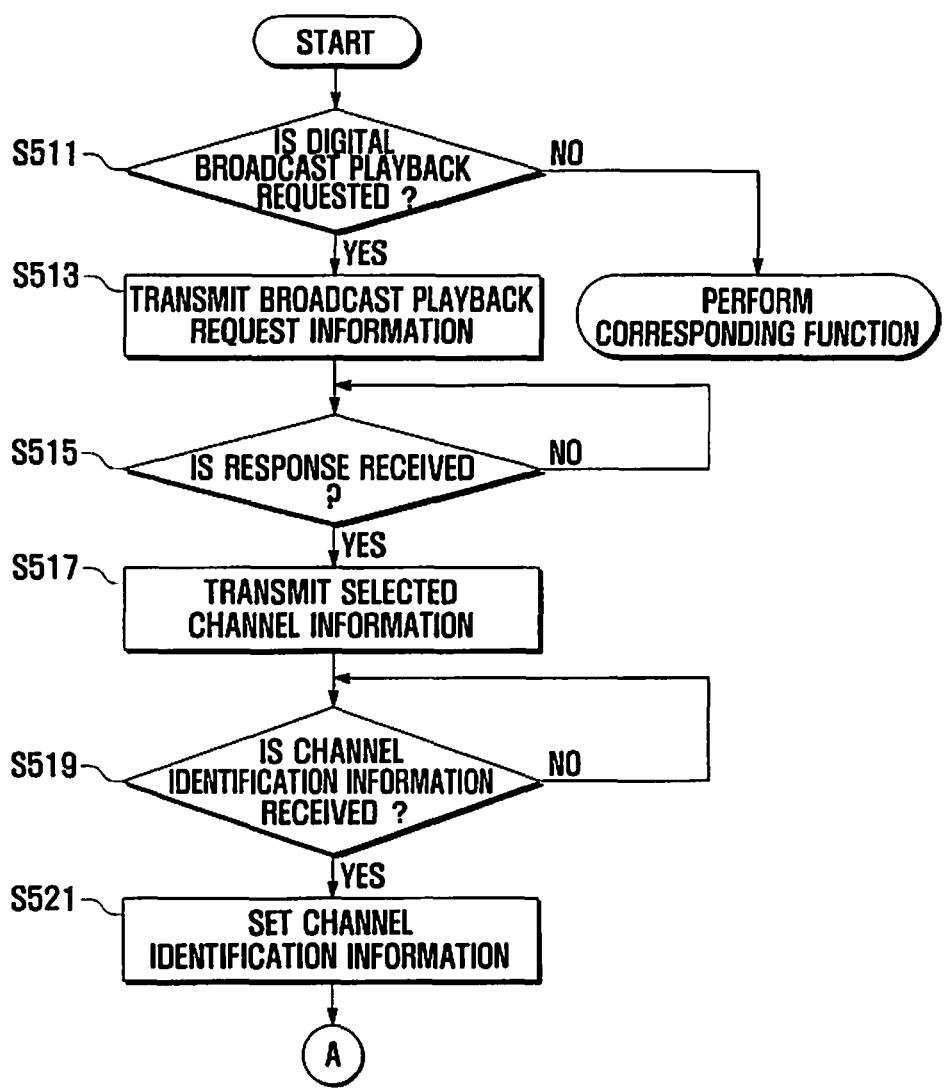
FIGS. 9A and 9B are flow charts illustrating the operation of the external device of FIG. 5.
Figure 9B:
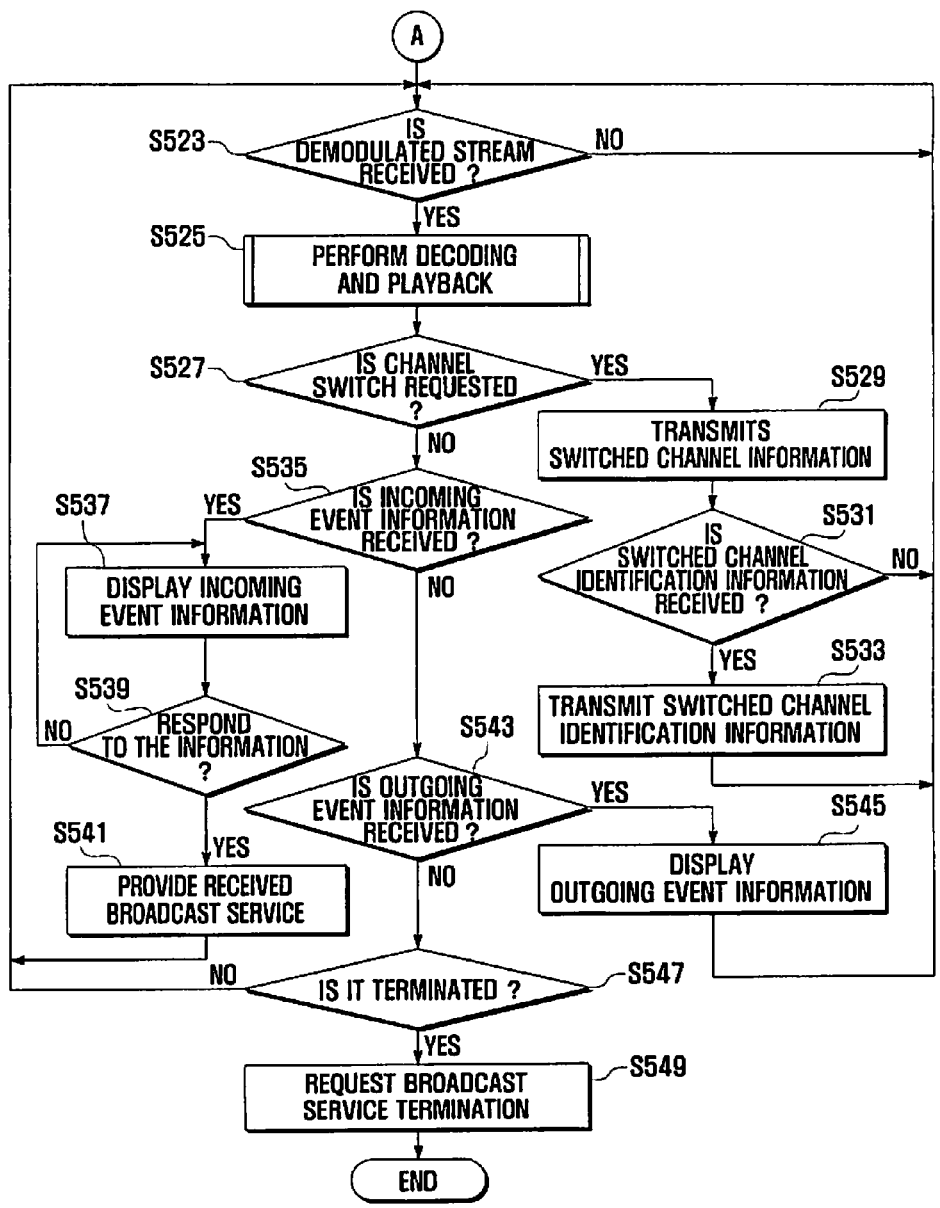

FIGS. 9A and 9B are a flow chart illustrating the operation of the external device 200 that plays back digital broadcast signals transmitted from the portable terminal 100.

Referring to FIGS. 9A and 9B, when a digital broadcast playback request is inputted through a key input unit 260, the PC controller 210 of the external device 200 detects the request at step S511. The PC controller 210 establishes a short-range communication link with the portable terminal 100 through the short-range communication unit 220 and then transmits information about the broadcast playback request through the communication link at step S513. Here, the short-range communication link may be implemented by wired and a wireless communication links. For example, the short-range communication link may employ USB communication for wired communication, and Bluetooth communication and Ultra-WideBand (UWB) for wireless communication. In an embodiment of the present invention, it is assumed that the short-range wireless communication employs Bluetooth communication. When response information of a portable terminal 100 is received through the short-range communication unit 220, the PC controller 210 detects the response information at step S515 and transmits information about a user's selected broadcast channel through the short-range communication unit 220 at step S517. When receiving identification information of the selected broadcast channel from the portable terminal 100, the PC controller 210 detects the identification information at step S519, and allows the decoding unit 230 to set the identification information at step S521. When the PC controller 210 already knows the identification information of the selected broadcast channel, it can skip step S521. When the digital broadcast is received through one broadcast channel allocated to one frequency channel, for example, terrestrial DMB, the PC controller 210 can skip the processes where of receiving and setting the broadcast channel identification information.

After that, the portable terminal 100 transmits broadcast signals demodulated in the digital broadcast receiver 170 through the short-range communication unit 180. The short-range communication unit 220 of the external device 200 receives the demodulated broadcast signals to output them to the decoding unit 230. The PC controller 210 detects whether TS stream of the demodulated broadcast signals is received at step S523, and, when received, decodes the demodulated broadcast signals at step S525. Here, the decoding unit 230 may include a demultiplexer (or an IP decapsulator) that classifies the broadcast stream into audio, vide, and broadcast information. Also, the PC controller 210 of the external device 200 may perform the functions of the demultiplexer (or an IP decapsulator). Therefore the broadcast signals having undergone the above processes are played back through the display unit 240 and the speaker 250, respectively.

Figure 10:
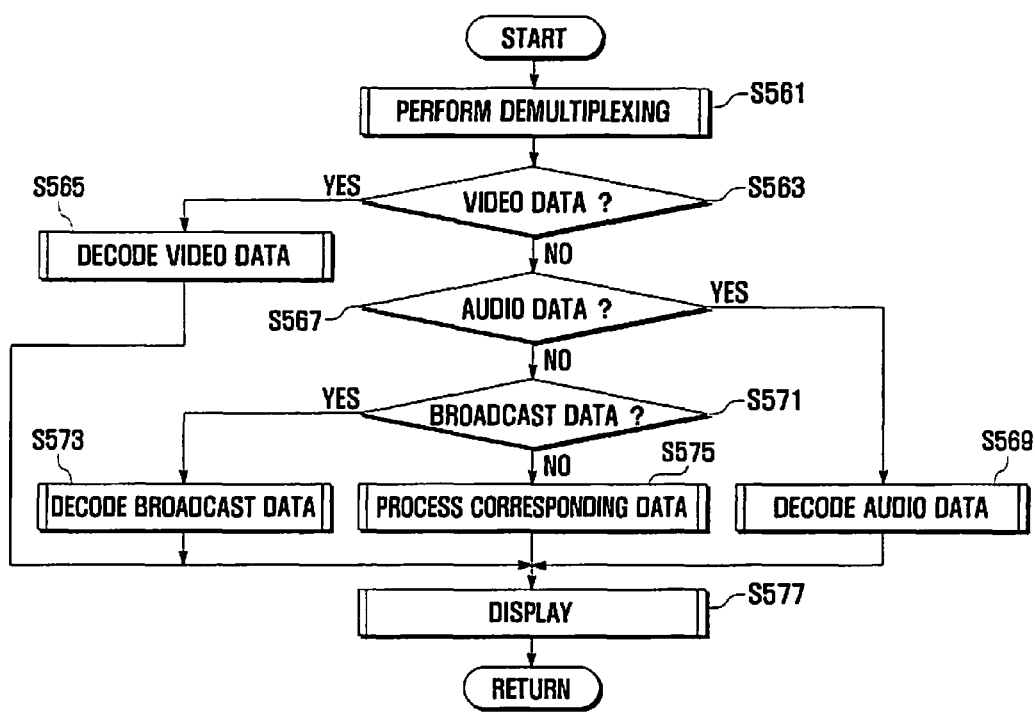
FIG. 10 is a flow chart illustrating a decoding process of the external device of FIGS. 9A and 9B.

FIG. 10 is a flow chart illustrating a detailed decoding process of the external device 200 at step S525 of FIG. 9B, in which the decoding unit 230 decodes the received broadcast signals. The decoding unit 230 adopts DMB, preferably.

Referring to FIG. 10, the decoding unit 230 extracts broadcast information, and audio and video streams, which include the identification information of the selected broadcast channel, from received demodulated broadcast streams, and allows corresponding decoders to demultiplex the extracted result, respectively at step S561. The decoding unit 230 includes an audio decoder for decoding encoded audio data, a video decoder for decoding encoded video data, and a broadcast information decoder for decoding broadcast information. When the encoded data to be demultiplexed is video data, the decoding unit 230 detects the encoded video data at step S563 and decodes it at step S565. The decoded video data is displayed on the display unit 240 at step S577. When the encoded data to be multiplexed is audio data, the decoding unit 230 detects the encoded audio data at step S567 and decodes it at step S569. The decoded audio data is output through the speaker 250 at step S577. On the contrary, when the encoded data to be multiplexed is broadcast information, the decoding unit 230 detects the encoded broadcast information at step S571 and decodes it at step S573. The decoded broadcast information is stored in the memory 270 at step S577. The broadcast information stored in the memory 270 may be displayed on the display unit 240 according to the control of the PC controller 210, as occasion demands.

Figure 11:
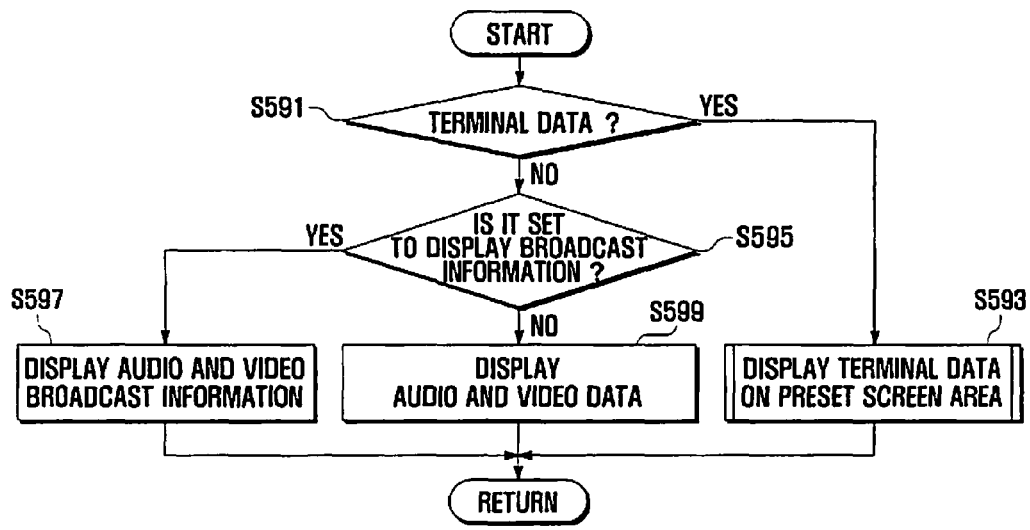
FIG. 11 is a flow chart illustrating a procedure for displaying the broadcast signals in FIG. 10.

FIG. 11 is a flow chart illustrating a procedure of displaying broadcast signals in FIG. 10.

Referring to FIG. 11, the controller 220 determines whether terminal data is received through the short-range communication unit 220 at step S591. When the terminal data has been received, the PC controller 210 displays it on a preset area of the display unit 240 at step S593. The terminal data may include data related to the operation of the terminals, for example, incoming event information, and outgoing event information, etc. The terminal data may be displayed on the broadcast screen, on screen, on the displays unit 240 or on an area where broadcast data is not displayed. When a user sets it that broadcast information can be displayed, the PC controller 210 detects the setting at step S595. The PC controller 210 outputs audio and video data to the speaker 250 and the display unit 240, respectively, and displays the broadcast information on a screen area of the display unit 240, where the video data is not displayed at step S597. The displayed broadcast information can be selected by the user. The broadcast information includes: currently viewing program information of a broadcast channel; program information of other broadcast channels airing at the current time; program information of a user's favorite broadcast programs; and program information of all broadcast channels. The broadcast information may display, in text and/or image, on a screen area of the display unit 240 where the broadcast screen is not displayed. When the broadcast information display function is not set, the PC controller 210 detects the setting at step S595, and processes the received broadcast signal (audio and video signals) to display it at step S599.

Returning to FIGS. 9A and 9B, while the broadcast signals of the selected broadcast channel at step S525 is decoding and playing back, when a channel switch is requested through the key input unit 260, the PC controller 210 detects the channel switch request at step S527, and transmits information of the user's selected switched channel to the portable terminal 100 at step S529. The PC controller 210 receives identification information of the switched channel and sets the decoding unit 230 based on the received identification information at steps S531 and S533. Thereafter, the broadcast signals are received through the switched channel and then undergo decoding and playing back at steps S523 and S525.

While the digital broadcast signals are decoding and playing back, when incoming event information is received through the short-range communication unit 220, the PC controller 210 detects it at step S535. The PC controller 210 displays the incoming event information on the display unit 240 and continues to decode and play back the digital broadcast at steps S537, S539, and S541. When outgoing event information is received, the PC controller 210 detects it at step S543. The controller displays the outgoing event information on the display unit 240 and continues to play back the digital broadcast at step S545.

While the digital broadcast signals are playing back, when a termination command is generated at step S547, the PC controller 210 requests broadcast termination to the portable terminal 100 at step S549, and controls the short-range communication unit 220 to disconnect the short-range communication link.

As describe above, the method and system for displaying digital broadcast signals, according to the present invention, establishes a short-range communication link between the portable terminal including a digital broadcast receiver and the external device, transmits the digital broadcast signals from the portable terminal to the external device through the short-range communication link, and allows the external device to process and play back the received digital broadcast signals. The external device includes a decoding unit. The portable terminal demodulates the broadcast signals of the established broadcast channel and transmits them to the external device 200 through the short-range communication link. The external device decodes the received demodulated broadcast signals to play them back. Therefore, the amount of data communicated between the portable terminal and the external device can be reduced. Since the system of the present invention displays broadcast signals on the display unit of the external device, which is relatively greater than that of the portable terminal, it can also display broadcast information on a screen area where the broadcast signals are not displayed, thereby enabling viewing of the digital broadcast to be convenient.

Furthermore, since the portable terminal only receives broadcast signals and transmits them to the external device that the external device can play back the broadcast, it can process incoming and outgoing events, independent of the digital broadcast, while the external device is playing back the broadcast.

Although exemplary embodiments of the present invention have been described in detail hereinabove, it should be understood that many variations and modifications of the basic inventive concept herein described, which may appear to those skilled in the art, will still fall within the sprit and scope of the exemplary embodiments of the present invention as defined in the appended claims.

What is claimed is:

1. A system for displaying digital broadcast signals comprising:
a portable terminal; and
an external device wirelessly communicating with the portable terminal,
wherein the portable terminal comprises:
a digital broadcast receiver that includes a tuner for tuning to a frequency of a selected broadcast channel and receiving a broadcast signal, a demodulator for demodulating the broadcast signal output from the tuner, and a first decoding unit for classifying the demodulated broadcast signals as audio, video, and broadcast information and for decoding the classified broadcast signals, respectively;
a first display unit and a first speaker for playing back the decoded broadcast signals output from the first decoding unit;
a terminal controller for selecting an output route of the demodulated broadcast signals in a digital broadcast playback mode of the external device, for interrupting a route of the broadcast signals applied to the decoding unit, and for controlling processes of an incoming communication event or an outgoing communication event, generated in the digital broadcast playback mode, while maintaining the digital broadcast playback mode;
a first short-range communication unit for wirelessly transmitting the demodulated broadcast signals to the external device so that the external device enters the digital broadcast playback mode under the control of the terminal controller, and for performing data communication between the terminal controller and the external device; and
a wireless communication unit for wirelessly communicating a communication signal, generated as the terminal controller processes the incoming or outgoing communication events, wherein the external device comprises:
a second short-range communication unit for receiving the demodulated broadcast signals wirelessly transmitted from the portable terminal;
a second decoding unit for decoding the demodulated broadcast signals;
a second display unit and a second speaker for playing back the decoded broadcast signals output from the second decoding unit; and
a second controller for wirelessly transmitting to the portable terminal a digital broadcast playback request and selected channel information through the second short-range communication unit and controlling playback of the received digital broadcast signals,
wherein the portable terminal wirelessly provides the incoming or outgoing communication event when the communication event is generated, while simultaneously wirelessly providing the broadcast signal for playback through the external device, and
wherein a protocol structure of a data stream for playing back the digital broadcast signals output from the first decoding unit includes a main command field and a sub command field that provide notification of digital broadcasting and a state of the portable terminal.

2. The system of claim 1, wherein, for the outgoing communication event, the terminal controller of the portable terminal transmits information about the outgoing communication event to the external device through the first short-range communication unit, controls the digital broadcast receiver to maintain the broadcast playback mode of the external device, and controls the wireless communication unit to provide the outgoing communication event.

3. The system of claim 2, wherein the second controller of the external device displays user's selected broadcast information on a screen area of the display unit, in which the broadcast signal is not displayed.

4. The system of claim 1, wherein, for the incoming communication event, the terminal controller of the portable terminal transmits information about the incoming communication event to the external device through the first short-range communication unit, controls the digital broadcast receiver to maintain the broadcast playback mode of the external device, and controls the wireless communication unit to provide the incoming communication event.

5. The system of claim 4, wherein the second controller of the external device displays user's selected broadcast information on a screen area of the display unit, in which the broadcast signal is not displayed.

6. A portable terminal for processing digital broadcast signals, the portable terminal comprising:
a digital broadcast receiver that includes a tuner for tuning to a frequency of a selected broadcast channel, a demodulator for demodulating broadcast signals output from the tuner, and a decoding unit for classifying the demodulated broadcast signals as audio, video, and broadcast information and for decoding the classified broadcast signals, respectively;
a controller for controlling the digital broadcast receiver in response to a received broadcast playback request and channel information through a first communication unit and controlling the first communication unit to transmit the demodulated broadcast signals to an external device, wherein the decoding unit does not decode the demodulated broadcast signals during transmission of the demodulated broadcast signals to the external device;
the first communication unit for wirelessly receiving the broadcast playback request and channel information from the external device and transmitting the demodulated broadcast signals of the digital broadcaster receiver to the external device, wherein a display unit and a speaker do not display and output the demodulated broadcast signals during the transmission of the demodulated broadcast signals to the external device through the first communication unit; and a second communication unit for wirelessly communicating a communication signal between the portable terminal and a base station, wherein the portable terminal wirelessly provides an incoming communication event or an outgoing communication event when a communication event is generated, while simultaneously wirelessly providing the broadcast signals for playback through the external device, and wherein a protocol structure of a data stream for playing back broadcast signals output from the decoding unit includes a main Command field and a sub Command field that provide notification of digital broadcasting and a state of the portable terminal.

7. The portable terminal device of claim 6, wherein the controller controls the digital broadcast receiver to switch a broadcast channel based on transmitted channel switch information received from the external device, and processes a broadcast signal received through the switched broadcast channel to generate a communication message and to transmit the communication message through the first communication unit.

8. The portable terminal device of claim 7, wherein the controller transmits incoming communication event information received by the second communication unit to the external device through the first communication unit.

9. The portable terminal device of claim 8, wherein the incoming communication event information includes a called user name and phone number.

10. The portable terminal device of claim 9, wherein, when responding to the incoming communication event, the controller transmits the broadcast signals output from the demodulator of the digital broadcast receiver through the first communication unit and processes an incoming call to establish a communication route with the called user through the second communication unit.

11. The portable terminal device of claim 7, wherein the controller provides the outgoing communication event through the second communication unit, and transmits information about the outgoing communication event through the first communication unit to the external device.

12. The portable terminal device of claim 11, wherein when responding to the outgoing communication event, the controller transmits the broadcast signal output from the demodulator of the digital broadcast receiver to the external device through the first communication unit and processes an outgoing call with a called user through the second communication unit.

13. The portable terminal device of claim 7, wherein the controller transmits an incoming message received by the second communication unit to the external device through the first communication unit.

14. A method for processing a broadcast signal of a portable terminal having a digital broadcast receiver, the method comprising:
wirelessly receiving a digital broadcast playback request and selected channel information from an external device through a first communication unit of the portable terminal;

controlling the digital broadcast receiver to select a broadcast channel according to the selected channel information, demultiplexing a broadcast signal of the selected broadcast channel, and demodulating the demultiplexed broadcast signal; and wirelessly transmitting the demodulated broadcast signal through the first communication unit to the external device having a decoding unit for decoding the demodulated broadcast signal, wherein the first communication unit wirelessly transmits the demodulated broadcast signal of the digital broadcaster receiver to the external device and performs data communication between the portable terminal and the external device, wherein the portable terminal wirelessly provides an incoming communication event or an outgoing communication event when a communication event is generated, while simultaneously wirelessly providing the broadcast signal for playback through the external device, and wherein a protocol structure of a data stream for playing back broadcast signals output from the decoding unit includes a main command field and a sub command field that provide notification of digital broadcasting and a state of the portable terminal.

15. The method of claim 14, further comprising:
controlling the digital broadcast receiver to switch a broadcast channel based on transmitted channel switch information received from the external device, and
processing a broadcast signal received through the switched broadcast channel to generate a communication message and to transmit the communication message through the first communication unit.

16. The method of claim 15, further comprising transmitting incoming communication event information received by a second communication unit to the external device through the first communication,
wherein the second communication unit wirelessly communicates a communication signal between the portable terminal and a base station.

17. The method of claim 16, wherein the incoming communication event information includes a called user name and phone number.

18. The method of claim 17, further comprising:
when responding to the incoming communication event, transmitting the broadcast signals output from the demodulator of the digital broadcast receiver through the first communication unit; and
processing an incoming call to establish a communication route with the called user through the second communication unit.

19. The method of claim 15, further comprising:
providing the outgoing communication event through a second communication unit; and
transmitting information about the outgoing communication event through the first communication unit to the external device,
wherein the second communication unit for wirelessly communicating a communication signal between the portable terminal and a base station.

20. The method of claim 19, further comprising, when responding to the outgoing communication event, transmitting the broadcast signal output from the demodulator of the digital broadcast receiver to the external device through the first communication unit and processing an outgoing call with a called user through the second communication unit.

21. The method of claim 15, further comprising transmitting an incoming message received by a second communication unit to the external device through the first communication unit, the second communication unit for wirelessly communicating a communication signal between the portable terminal and a base station.

* * * * *